United States Patent [19]

Takashima

[11] 3,953,219

[45] Apr. 27, 1976

[54] POWDERY COMPOSITION FOR HEAT RETENTION OF FEEDER HEAD

[75] Inventor: Masaru Takashima, Wakabaya, Japan

[73] Assignee: Aikoh Co., Ltd., Tokyo, Japan

[22] Filed: Sept. 20, 1974

[21] Appl. No.: 507,717

Related U.S. Application Data

[63] Continuation-in-part of Ser. No. 269,091, July 5, 1972, abandoned.

[30] Foreign Application Priority Data

July 10, 1971 Japan.............................. 46-50717

[52] U.S. Cl.......................... 106/38.27; 106/38.28; 106/38.9
[51] Int. Cl.².......................................... B28B 7/36
[58] Field of Search...................... 164/123, 122, 53; 106/38.22, 38.27, 38.28, 38.9

[56] References Cited
UNITED STATES PATENTS

| | | | |
|---|---|---|---|
| 2,798,818 | 7/1957 | Pletsch................................ | 164/53 |
| 3,082,104 | 3/1963 | Belz...................................... | 164/53 |
| 3,162,558 | 12/1964 | Bishop et al.......................... | 164/53 |
| 3,612,155 | 10/1971 | Matsuyama et al................... | 164/53 |
| 3,713,852 | 1/1973 | Wiley.................................. | 106/38.3 |
| 3,848,655 | 11/1974 | Sato et al............................ | 249/197 |

Primary Examiner—Lorenzo B. Hayes
Attorney, Agent, or Firm—Fay & Sharpe

[57] ABSTRACT

A powdery composition for heat retention of feeder head comprising carbonized plant (i.e., baked vegetable material) containing a large amount of fibrous matter and at least one substance selected from refractory material, easily oxidizable metal, metal oxide and inorganic material effective for heat retention of feeder head, each of said substances having a particle size distribution of less than 50% in parts by weight of 48 to 200 mesh particles with the remainder being particles larger than 48 mesh and smaller than 200 mesh and the amount of said substance having a particle size of larger than 48 mesh being approximately equal to that of said substance having a particle size of smaller than 200 mesh.

12 Claims, No Drawings

POWDERY COMPOSITION FOR HEAT RETENTION OF FEEDER HEAD

This application is a continuation-in-part application of U.S. Pat. application Ser. No. 269,091, filed July 5, 1972, for "A Powdery Composition for Heat Retention of Feeder Head" now abandoned.

The present invention relates to a powdery composition for heat retention of feeder head and more particularly relates to a powdery composition for heat retention of feeder head which is used for prolonging the fluidity of the steel in the feeder head when steel ingots are made.

The conventional heat retaining composition for feeder head in a practical use if mainly based upon a material produced by a thermit reaction with addition of materials which are effective to exothermic reaction and do not adversely affect the constituents of molten steel, and a variety of such compositions have been proposed. Also, there are a variety of methods for addition, such as a method whereby a predetermined amount of the composition is added at one time, a method whereby a predetermined amount of a composition is added in division, and a method whereby a predetermined amount of the heat generating composition is first added and a heat insulating material is then added to cover the surface. However, these methods are not satisfactory.

This is due to the fact that in view of the heating of the feeder head top face by means of heat generating composition, only the calorific value of the composition has been considered important, and thereby efforts have been directed to the selection of raw materials and improvement of the composition without giving much consideration to conditions of the residue after completion of the exothermic reaction, and also with giving little consideration to the particle size index of the composition.

Therefore, when such composition is used, the aggregate of the heat generating composition added to the top face of molten steel immediately after completion of its pouring into a casting mold absorbs a large amount of heat in the period of time until initiation of the exothermic reaction, which is not desirable for heat retention of the feeder head.

Therefore, the heat retaining effect of the composition for feeder head, produced on the basis of the technical thought attaching importance only to calorific value, has been naturally limited and very difficult to render it more effective.

According to the present invention, there is provided a powdery composition for heat retention of feeder head comprising a carbonized plant containing from 5 to 25% by weight of fibrous matter and at least one substance selected from refractory material, easily-oxidizable metal, metal oxide and other inorganic material effective for heat retention of the feeder head, each of said substances having a particle size distribution of less than 50% by weight of from 48 to 200 mesh particles with the remainder being particles larger than 48 mesh and smaller than 200 mesh and the amount of said substance having a particle size of larger than 48 mesh being approximately equal to that of said substance having a particle size of smaller than 200 mesh, i.e., the ratio of larger than 48 mesh particles to smaller than 200 mesh particles being approximately 1:1.

In the powdery composition for heat retention of feeder head according to the present invention, preferably the quantity of carbonized plant ranges from 5 to 25% by weight and the quantity of at least one substance selected each from refractory material, easily-oxidizable metal, metal oxide and inorganic material effective for heat retention of the feeder head is from 95 to 75% by weight.

The heat retaining material of feeder head top face when making steel ingot according to the present invention, although based on heat generating materials, does not attach importance to the calorific value, and improves the heat retaining effect of feeder head by limiting the particle size distribution of effective inorganic materials used as raw materials to a proper range, and is based on the knowledge that the calorific value heretofore considered particularly important has a secondary importance.

Thus, the present invention, after performing research for a long period and numerous experiments, has confirmed that the heat retaining effect of feeder head can be improved over that of the conventional composition by using a calorific value of 1,200 to 1,500 cal/g less than 1,800 to 2,000 cal/g required in the conventional composition.

While it is quite easy to improve the heat retaining effect of feeder head by using a composition having an increased calorific value by increasing the content of metallic aluminum, it has a high industrial value that the content of easily-oxidizable metal powder such as metallic aluminum which is a heat source and the most expensive of raw materials is reduced, that is, a less calorific value is used, and physical properties of the powder are utilized to attain a satisfactory heat retaining effect.

Filing of balls of equal size provides constant voids independently of the particle diameter. However, in case of fine particles, the voids tends to increase with the particle diameter and decrease therewith.

Therefore, when only coarse particles are used in raw materials used for the composition for heat retention of feeder head, the voids of the aggregate thereof is large, thereby leading to a good head insulation, and the exothermic reaction and combustion also proceed in normal condition, but on the other hand, air vents are also formed to dissipate heat therethrough, thereby lowering the heat retaining effect for feeder head. And, when only fine particles or powders are used, the composition in the form of aggregate added to the top face of molten steel in the casting mold requires about 10 seconds to the initiation of exothermic reaction or ignition, during which period the composition absorbs the heat of molten steel, and thereafter the heat generation or combustion initiates. Moreover, at the same time with the ignition, localized and violent reaction condition is effected to blow up light materials in the form of powder, and thereby effective components for heat retention of the feeder head are scattered resulting in the deterioration of heat retaining effect for the feeder head.

The present invention provides a heat generating composition for heat retention of feeder head, which eliminates such conventional defects as described above, and with adjusted particle size distribution of raw materials, particularly, inorganic effective materials, forms a desirable aggregate condition when added to molten steel surface within the casting mold, and rapidly starts the reaction, and maintains a slow combustion condition for a long period of time and thereby continuously maintains a satisfactory condition of heat retention for feeder head during and after the reaction.

As used herein and in the appended claims, the following items shall have the following meaning: 'easily-oxidizable metal' is meant a metal which will readily oxidize in an exothermic reaction when the powdery composition is added to the surface of a molten metal; by the term 'metal oxide' are meant metal oxides which are capable of undergoing an exothermic oxidation reaction, for example, ferrous oxide, ferric oxide, tri-iron tetroxide, manganese dioxide; by the term 'effective inorganic material' is meant that the inorganic material will undergo an exothermic oxidation reaction or that it will merely be effective in acting as heat insulator; and by the term 'refractory materials' is meant the materials such as aluminum dross, quartz sand, fire clay, vermiculite and diatomaceous earth.

The composition according to the present invention comprises carbonized plant, i.e., baked fibrous vegetable material, containing from 5 to 25% by weight of fibrous matter such as chaff, straw, plant (vegetable) shell or the like and one or more substances, for example, refractory materials such as aluminum residual ash, quartz, sand, fire clay, vermiculite, diatomaceous earth and the like; easily-oxidizable materials such as metallic aluminum, aluminum alloy and calcium-silicon, metal oxides such as ferrous oxide, ferric oxide, tri-iron tetroxide and manganese dioxide, and effective inorganic material selected from metallic fluoride such as sodium fluoride, aluminum fluoride and aluminum sodium fluoride, alkali metal nitrate or alkaline earth metal nitrate, such as sodium nitrate and potassium nitrate, with said substances having a distribution, in parts by weight, of less than 50% particles, with the remainder being particles larger than 48 mesh and smaller than 200 mesh and the amount of particles larger than 48 being essentially equal to those having a particle size smaller than 200 mesh.

That is, as previously described, even if a heat generating composition is skillfully composed and has a high calorific value, the desired heat retaining effect for feeder head cannot be obtained when its particle size distribution consists of only coarse particles, or only fine particles and fine powders.

The carbonized plant used as a raw material in the composition of the present invention is combustible, and forms voids in the aggregate produced by adding it in the composition, and also because it substantially completely burns away, thereby further producing voids of larger volume and thus forming a desirable heat insulating layer on the feeder head.

The invention will now be further described with reference to the following Example in which compositions 1 and 2 are included for the purposes of comparison to show the effect of particle size distribution at variance with that required by compositions of the invention.

Example

The components, compositions and particle size distributions of the powdery composition for heat retention of feeder heads are shown in Table 1.

TABLE 1

| Component | Mixing ratio (% by weight) | Particle size distribution (% in parts by weight) by Tyler Standard Sieve System | | | |
|---|---|---|---|---|---|
| | | No. 1 | No. 2 | No. 3 | No. 4 |
| Baked chaff | 13 | — | — | — | — |
| Metallic aluminum | 11 | | | | |
| Ferric oxide | 5 | | | particle size coarser than 48 mesh 25% | particle size coarser than 48 mesh 50% |
| Manganese dioxides | 3 | particle size coarser than 100 mesh 100% | particle size finer than 100 mesh 100% | particle size finer than 200 mesh 25% | particle size finer than 200 mesh 50% |
| Aluminum residual ash | 63 | | | particle size, 48 – 200 mesh 50% | |
| Sodium nitrate | 3 | | | | |
| Aluminum sodium fluoride | 2 | | | | |
| Calorific value (cal/g) | | 1300 | | | |

The compositions having the same ratio of components but different particle size distributions of effective inorganic materials as indicated in Table 1 were subjected to a comparison test of heat retaining effect for feeder head, thereby the following results were obtained as shown in Table 2.

TABLE 2

| Size of feeder head | No. 1 | No. 2 | No. 3 | No. 4 |
|---|---|---|---|---|
| Height of periphery part of feeder head (mm) | 250 | 254 | 222 | 220 |
| Height of center part of feeder head (mm) | 160 | 140 | 180 | 185 |

Along the upper inner wall of square casting mold was mounted a heat insulating molded material for feeder head, and ingots were produced under approximately the same conditions and by adding 13 kg of each of the compositions No. 1 to No. 4. From the head shape of 6.4 ton steel ingot thus produced as indicated in Table 2, it was found that the composition having only particle size coarser than 100 mesh (No. 1) and the composition having only particle size finer than 100 mesh (No. 2) are both less effective in the heat retention of feeder head than the compositions having the particle size distribution of the present invention (Nos. 3 and 4).

Also, the composition No. 2 scattered dust at the same time with its addition to the top face of molten steel poured into the casting mold and interfered with the ingot making operation.

In the heat retaining composition for feeder head top face of this invention, the carbonized plant (i.e., baked vegetable) is combustible and used as a heat source, and, particularly, it converts the composition to sugged pile upon adding to the top face of molten steel, and effects rapid and smooth initiation of the combustion and exothermic reaction, and further makes its residue form void, thereby covering the top face of feeder head as a desirable heat insulating layer. The preferable content of said carbonized plant (i.e., baked vegetable) in a range of from 5 to 25% by weight. Its content less than 5% by weight does not produce the effects as described above, and its content exceeding 25% by weight forms air vents in the residue to dissipate heat, thereby reducing the heat retaining effect, and further the volume of the residue becomes smaller than the volume of the composition as added, and it should not be used in an amount exceeding 25% by weight.

Also, excepting the baked vegetable or fibrous substance of from 5 to 25% by weight, the particle size distribution of other inorganic effective materials of from 95 to 75% by weight consists of 48 to 200 mesh by not more than 50% in parts by weight and the sum total of coarser than 48 mesh and finer than 200 mesh by from 50 to 100% in parts by weight, and about an equal amount of coarser than 48 mesh and finer than 200 mesh must be contained. When a larger amount of grain sizes larger than 48 mesh or a larger amount of grain sizes smaller than 200 mesh is contained, the heat retaining effect is undesirably lowered. And, while the content and particle size of easily oxidizable metals and metal oxides are determined depending on the weight of steel ingot, shape of feeder head top face, its area, type of steel and others, the grain size distribution of the inorganic effective materials in the composition should always include about an equal amount of each of the two particle size ranges described above.

The fact that in the use of inorganic effective materials as raw materials of the present invention, approximately an equal amount of each of particle sizes coarser than 48 mesh and finer than 200 mesh leads to the satisfactory heat retaining effect for feeder head, has been found based on many experimental results. The reason for this resides in that most of the particle fines than 200 mesh of the raw materials adhere onto the particles larger than 48 mesh to thereby form an aggregate, which is further uniformly mixed with the baked vegetable resulting in an accumulation which covers the top face of molten steel, forms suitable void, causes a rapid initiation of reaction, continues a satisfactory combustion exothermic reaction, and further provides a desirable residue condition after completion of the reaction.

Therefore, a composition containing the inorganic effective materials which have a particle size distribution consisting of about 50% in parts by weight of particles coarser than 48 mesh and about 50% in parts by weight of particles finer than 200 mesh provides the most satisfactory heat retaining effect for feeder head. When the amount of each particle size range is below 25% in parts by weight, the raw materials having a particle size of 48 to 200 mesh will be contained in an amount above 50% in parts by weight, resulting in a composition unable to provide the desired heat retaining effect. This is caused by the fact that due to a variety of shapes of most particles of the raw materials, an accumulation containing a variety of particle sizes has the voids therein greatly reduced and/or contains many relatively small air vents.

Therefore, the raw inorganic materials having below 25% in parts by weight of each of particle sizes coarser than 48 mesh and finer than 200 mesh should not be used. It has been also found by experimental results that an unequal amount of each of the two particle sizes does not provide the desired heat retaining effect for feeder head. This is caused by the fact that a desirable voids is not formed in the accumulation of composition when added to the top face of molten steel.

The heat retaining composition for feeder head consisting of heat generating components according to the present invention has advantages that the particle size distribution of mineral materials in its raw materials is limited to a specific range, and further about equal amounts of particle sizes in the specific range are contained, attaching a secondary importance to its calorific value. And, it has been found by experiments that the void thus formed in the accumulation of powders provides an improved heat retaining effect for feeder head over the conventional ones. Thus, the heat retaining composition for feeder head of this invention can reduce the amount of easily oxidizable metals used, and a process for making steel ingot using this composition is very useful in the industry.

What is claimed is:

1. In a powdery composition for heat retention of feeder head which comprises from about 5 to about 25% by weight of a carbonized plant material and from about 75 to about 95% by weight of a mixture including at least one refractory material, at least one easily oxidizable metal, at least one metal oxide and at least one inorganic material effective for heat retention of feeder head; the improvement comprising each of the ingredients in said mixture having a particle size distribution, by the Tyler Standard Sieve System, of less than 50% by weight of 48 to 200 mesh particles, with the remainder being coarser than 48 mesh particles plus finer than 200 mesh particles which are present in a ratio of coarser to finer particles of approximately 1:1.

2. A powdery composition for heat retention of feeder head as claimed in claim 1 wherein the carbonized plant is selected from the group consisting of carbonized chaff, straw, vegetable shell and mixtures thereof.

3. A powdery composition for heat retention of feeder head as claimed in claim 1 wherein the refractory material is selected from the group consisting of aluminum residual ash, quartz, sand, fire clay, vermiculite, diatomaceous earth and mixtures thereof.

4. A powdery composition for heat retention of feeder head as claimed in claim 1 wherein the easily oxidizable metal is selected from the group consisting of metallic aluminum, aluminum alloy, calcium-silicon alloy and mixtures thereof.

5. A powdery composition for heat retention of feeder head as claimed in claim 1 wherein the metal oxide is selected from the group consisting of ferrous oxide, ferric oxide, triiron tetroxide, manganese dioxide and mixtures thereof.

6. A powdery composition for heat retention of feeder head as claimed in claim 1 wherein the inorganic material is selected from the group consisting of metallic fluorides, alkali metal nitrates, alkaline earth metal nitrates and mixtures thereof.

7. In the method for the heat retention of feeder head comprising applying to the surface of molten metal while in a mold a composition including from about 5 to about 25% by weight of a carbonized plant and from about 75 to about 95% of a mixture including at least one refractory material, at least one easily oxidizable metal, at least one metal oxide and at least one inorganic material effective for heat retention of feeder head; the improvement comprising providing a particle size distribution of each component of said mixture, by the Tyler Standard Sieve System, of less than 50% by weight of 48 to 200 mesh particles with the remainder being coarser than 48 mesh particles plus finer than 200 mesh particles which are present in a ratio of coarser to finer particles of approximately 1:1.

8. The method of claim 7 wherein the carbonized plant is selected from the group consisting of carbonized chaff, straw, vegetable shell and mixtures thereof.

9. The method of claim 7 wherein the refractory material is selected from the group consisting of aluminum, residual ash, quartz, sand, fire clay, vermiculite, diatomaceous earth and mixtures thereof.

10. The method of claim 7 wherein the easily oxidizable metal is selected from the group consisting of metallic aluminum, aluminum alloy, calcium-silicon alloy and mixtures thereof.

11. The method of claim 7 wherein the metal oxide is selected from the group consisting of ferrous oxide, ferric oxide, tri-iron tetroxide and manganese dioxide and mixtures thereof.

12. The method of claim 7 wherein the inorganic material is selected from the group consisting of metallic fluorides, alkali metal nitrates and alkaline earth metal nitrates and mixtures thereof.

* * * * *